Nov. 12, 1957

W. W. TWADDLE ET AL 2,813,089

DIRECT PRODUCTION OF POLYSTYRENE FROM
PETROLEUM BY-PRODUCT ETHYLBENZENE

Filed July 21, 1955

INVENTORS:
Warren W. Twaddle
Arthur A. Harban
Vernon W. Arnold

BY

ATTORNEY

United States Patent Office 2,813,089
Patented Nov. 12, 1957

2,813,089

DIRECT PRODUCTION OF POLYSTYRENE FROM PETROLEUM BY-PRODUCT ETHYLBENZENE

Warren W. Twaddle, Hammond, Ind., Arthur A. Harban, Park Forest, Ill., and Vernon W. Arnold, Hammond, Ind., assignors to Standard Oil Company, Chicago, Ill., a corporation of Indiana Application July 21, 1955, Serial No. 523,536

15 Claims. (Cl. 260—93.5)

This invention relates to an improved process for the commercial production of polystyrenes suitable for injection molding, extrusion, etc. from an ethylbenzene-xylene mixture obtained in the hydroforming of naphtha without the necessity of separating ethylbenzene or styrene from the xylene solution. More specifically, the invention pertains to an improved process for directly polymerizing styrene from a solution formed by selectively dehydrogenating the ethylbenzene contained in a xylene solution.

An object of this invention is to provide an improved method and means for producing polystyrene directly from an ethylbenzene-xylene solution which has been subjected to defined dehydrogenation treatment and freed from tars and water. Another object is to provide an improved polymerization and polymer recovery system. The invention will be described as applied to an integrated system and defined in the annexed claims.

An important object of the invention is to provide a process for making polystyrene from by-product petroleum ethylbenzene which does not require separation and purification of either the ethylbenzene or the styrene monomer (other than drying) whereby the total investment and operating costs are enormously reduced. In other words, an objective is to provide an integrated dehydrogenation and polymerization process wherein the same xylene carrier is comon to both steps and the effluent stream from the first step requires only removal of higher boiling components (tar), lower boiling materials (gas), and water before being charged to the second step. An object is to provide the specific catalysts and conditions in both the dehydrogenation and polymerization which are essential for obtaining products of required properties in maximum yields with minimum by-product formation and at minimum investment and operating cost. Other objects will be apparent as the detailed description of the invention proceeds.

In practicing the invention a $C_8$ aromatics fraction containing about 10 to 40 percent, preferably about 20 to 30 percent, ethylbenzene is obtained from hydroformed naphtha by fractionation to eliminate higher and lower boiling components and to substantially eliminate hydrocarbons other than aromatics, the $C_8$ aromatic fraction thus being a solution of ethylbenzene in mixed xylenes which may have the approximate composition 1:1:3 ortho-, para-, and meta-xylene. To each pound of this solution at least 2 and preferably about 2½ pounds of steam is added so that the total charge will contain at least 12 and preferably about 15 mols of steam per mol of solution. When lesser amounts of steam, e. g. below about 2 pounds per pound of aromatics, are employed, the activity of the dehydrogenation catalyst decreases rapidly with time, lowering the conversion to styrene. Ratios of steam to aromatics substantially greater than 2½ pounds per pound may be employed but they give little or no improvement in styrene yield. The steam may be added either to the cold liquid aromatic hydrocarbon mixture or to an aromatic charge which has been heated to a temperature above its varporization point. Preferably, the steam is added when the hydrocarbon vapors are at a temperature of about 150° C. and the mixture of vapor and steam is then preheated in an exchanger to a temperature in the range of about 430 to 530° C. and then passed to a direct-fired furnace wherein the mixture is heated to about 670 to 730° C., e. g. about 700° C., with a residence time in the furnace of a fraction of a second, preferably not more than about ½ second since times substantially greater than this lead to excessive cracking. Temperatures above 730° C. lead to excessive cracking and lower ultimate yields of styrene while temperatures below 670° C. lead to decreased styrene yield because of lowered catalyst activity and failure of the catalyst to be auto-regenerative.

The catalyst employed for the dehydrogenation is preferably a steam-regenerative, alkali-promoted iron catalyst of the type commonly known in the art as "Shell 105" or "Shell 205." Such a catalyst may consist essentially of 85 percent $Fe_2O_3$, 2 percent $Cr_2O_3$, 12 percent KOH and 1 percent NaOH or of 90 percent $Fe_2O_3$, 4 percent $Cr_2O_3$ and 6 percent $K_2CO_3$; the catalyst compositions and the method of making same are disclosed in U. S. 2,408,140, 2,414,585 and 2,461,147. While these known commercial dehydrogenation catalysts are preferred, the invention is not limited thereto and other known "steam-regenerative" dehydrogenation catalysts such as Jersey 1707 may be employed (Ind. Eng. Chem. 42, No. 2, pp. 295 et seq.; 1950).

The dehydrogenation is preferably effected at a pressure in the range of about 1 to 10 p. s. i. g. and with a space velocity of about 0.5 to 4 volumes of liquid aromatic charging stock per hour per volume of catalyst. Dehydrogenation may be effected in either an isothermal or an adiabatic catalyst bed, an isothermal bed at about 700° C. being preferred for optimum yields of styrene. The residence time of hydrocarbon in the dehydrogenation reactor should be of the order of about .1 to .6 second.

The dehydrogenation reactor effluent is immediately cooled, for example, to about 300 to 320° C., then further cooled, for example, to about 50° C. for condensation of liquids from gases, the gases being further refrigerated for recovery of styrene and aromatics contained therein. After separating water from the condensate the latter is distilled to obtain a solution of styrene in xylenes which contains some ethylbenzene, toluene and benzene and which, after drying but without any further purification or separation, may be introduced directly into a polymerization reactor wherein the styrene monomer is converted to high molecular weight polymer by contact with a catalyst consisting essentially of finely divided metallic sodium. The use of this type of catalyst in the polymerization step is important since neither thermal polymerization, free radical polymerization or polymerization with acid type (Friedel-Crafts) catalysts were effective for obtaining polystyrene of desirable properties in feasible yields in the xylene solution. With finely divided sodium catalyst, i. e. sodium particles about 1 to 100, preferably 2 to 50, microns particle size, dispersed, for example, in about an equal weight of xylene or other diluent and employed in amounts of about .1 to .6 percent, preferably about 0.2 to .4 percent by weight based on styrene, conversions upwards of 90 percent are obtained in 5 to 30 minutes or more (after an induction period of 5 to 20 minutes) giving polystyrenes of various molecular weights depending primarily upon the temperature maintained in the polymerization step. At about 100° C. polymers having an intrinsic viscosity (as measured in benzene at 30° C.) of about 0.1 are obtained while at 60° C. the intrinsic viscosity of the polymer is of the order of 1.0. Thus by effecting polymerization at a controlled temperature in the range of about 40 to 100° C. (40 to 75° C., preferably 40 to 65° C. for molding grade) with finely divided sodium, any desired molecular weight of polystyrene may be obtained from which the minute amount of catalyst can be readily separated by filtration from the xylene solution.

In order to obtain a styrene polymer of more uniform intrinsic viscosity or molecular weight, it is desirable after about 60 percent of the monomer has been polymerized, e. g. at 50° C., to either gradually lower the polymerization temperature, e. g. to about 40° C., and/or to add a promoter or polymerization accelerator such as a low boiling aliphatic or cyclic ether, e. g. dimethylether. The heat of polymerization is removed by vaporizing a part of the monomer solution at controlled subatmospheric pressure and a feature of the process is that the vaporization of diluent does not alter the concentration of monomer in the solution since the styrene monomer has substantially the same boiling point as the xylene diluent so that, regardless of fluctuations in the rate of vaporization, the temperature can be maintained substantially constant and, at the same time, concentration of monomer in vapors is always substantially the same as that in the liquid phase.

The polymerization is preferably effected batch-wise and while the major amount of polymerization may be effected in about ½ hour or less, it is usually desirable to continue the reaction for a period of 1 to 3 hours with the latter part of the reaction at decreased temperature which is attained by increasing the vacuum applied to the polymerization reactor. This technique enables the polymerization of substantially all of the monomer without forming large amounts of low molecular weight polymer at the end of the reaction period.

When reaction has been completed the viscous polymer solution is either filtered to remove sodium and sodium hydroxide or treated with $Na_2SO_4 \cdot 6H_2O$ for insuring conversion of residual sodium to sodium hydroxide and then treated with $NaHSO_4$ to effect conversion of the sodium hydroxide to sodium sulfate and water, the water being removed by contacting with a suitable diluent such as bauxite. When it is desired to obtain a polystyrene of high impact strength it may be desirable to add about 2 to 20 percent of synthetic or natural rubber to the catalyst-free solution at this point. This catalyst-free solution is then heated to a temperature of about 200 to 300° C., preferably about 250 to 275° C. and most of the solvent is removed therefrom in a flash drum at about .1 to 1 atmosphere pressure. The remaining viscous solution which may be about 3 parts polymer and 1 part solvent is then extruded in thin streams into a vacuum chamber maintained at about 1 to 50 mililmeters, preferably 2 to 20 millimeters, absolute pressure for completing the removal of solvent and the substantially solvent-free polymer is then extruded through a cooling zone to a pelleting machine.

The solvent removed in the flash and vacuum drying, together with solvent removed in maintaining the vacuum on the reactor, is treated with clay maleic anhydride or other known means to remove any unreacted styrene monomer and the solvent is then fractionated to recover benzene and toluene formed in the system, unreacted xylenes which were introduced with the original charge and any bottoms material.

The invention will be more clearly understood from the following detailed description of a specific example thereof read in conjunction with the acompanying drawing which is a schematic flowsheet of the system for producing styrene from a petroleum by-product ethylbenzene stream.

While any source of ethylbenzene-containing $C_8$ aromatics may be employed, such aromatics are preferably obtained by extracting aromatics from a naphtha hydroforming process such, for example, as hydroforming, platforming, ultraforming, and the like, preferably employing a polyethylene glycol solvent as exemplified by the commercial Udex process. The extract, after removal of solvent, is then fractionated by distillation to remove from the $C_8$ aromatics substantially all hydrocarbons which are higher boiling and lower boiling. A $C_8$ aromatics fraction is thus obtained which is substantially free from other hydrocarbons and which may consist of about 20 to 30 percent ethylbenzene mixed with xylenes having the approximate composition 1:1:3 ortho-, para-, meta-xylene. Alternatively a hydroformed naphtha may first be distilled to obtain a $C_8$ fraction and aromatics may then be separated from the $C_8$ fraction by adsorption, extractive distillation or other separation means known to the art.

The $C_8$ aromatics stream obtained as hereinabove described, which in this example contains 28 percent ethylbenzene, may be vaporized and heated to about 150° C., and introduced through line 10 and about 2½ pounds of steam is introduced through line 11 for each pound of aromatics so that the mol ratio of steam to aromatics will be at least 12:1 and preferably 15:1 or more. The mixture of steam and aromatics is then preheated in exchanger 12 to a temperature of about 500° C. after which the preheated mixture is charged by line 13 to furnace 14 which is preferably a direct-fired vertical-tube Petrochem furnace wherein it is further heated to about 700° C. during its contact time in the furnace tube of approximately ½ second. The hot mixture then passes through line 15 to dehydrogenation reactor 16 which contains Shell 205 steam-regenerative, alkali-promoted iron oxide catalyst. The reactor is preferably of tubular design with indirect heating so that the endothermic dehydrogenation reaction may be carried out essentially isothermally, the catalyst being mounted in tubes and a heating fluid such, for example, as flue gas from furnace 14 being passed around the tubes for maintaining the temperature at the desired level of about 700° C. If an adiabatic reactor is employed, the temperature drop across the catalyst bed may be as much as about 50° C. and in such case it would be preferred to employ a reactor inlet temperature of about 730° C. In this example the dehydrogenation reactor is operated substantially isothermally at about 700° C. with an inlet pressure of about 6 p. s. i. g., a space velocity of about 2 volumes of aromatics per hour per volume of catalyst space and a residence time in the reactor of about ⅓ second.

The reactor effluent is immediately cooled in exchanger 12 to a temperature of about 310 to 320° C. and is then passed by line 17 through cooler 18 which cools the mixture to a temperature of about 50° C. at which temperature the cooled mixture is introduced into separator 19. Gas from the separator, chiefly steam, hydrogen, carbon dioxide, methane, $C_2+$ hydrocarbons and some aromatics, is removed from the separator through line 20 to condenser 21 which cools these gases to a temperature of about 30° C. for effecting further condensation, the cooled mixture being introduced into separator 22. Gases are removed from separator 22 through line 23 to cooler 24 wherein the gases are further cooled to about 0 to −10° C. for effecting still further condensation, the mixture from cooler 24 being introduced to separator 25 and gases vented from the system through line 26. Condensate from separator 25 is returned by line 27 to separator 22. Condensate from separator 22 is returned by line 28 to line 29 which withdraws liquid from separator 19, the combined liquids being introduced into separator 30 for separating an aqueous phase which is withdrawn through line 31 and a liquid hydrocarbon phase which is introduced by lines 32, 36 and 33 at the base of distillation tower 34 below a trap-out plate 35 which is in the lower part of the tower. Liquid which collects in the trap-out pan 35 passes by line 36 through reboiler 37 and thence by line 33 back to the base of the tower to supply the heat required for vaporizing the diluted styrene. Materials higher boiling than $C_8$ aromatics (i. e.

tar) are withdrawn from the base of tower 34 through line 38. All other materials are taken overhead through line 39 and cooler 40 to receiver 41 from which gas may be vented by line 42. Liquid may be removed from receiver 41 by pump 43, a part of it being returned by line 44 to serve as reflux in the distillation tower and the remainder through line 45 to monomer solution surge drum 46. In this particular example about 17 pounds of gases are vented through line 26 and about 2 pounds of tarry bottoms are removed through line 38 per hundred pounds of $C_8$ aromatics charged. The intermediate product in surge drum 46 consists essentially of 15–25 percent or about 20 percent styrene, about 5 percent unconverted ethylbenzene, about 9 percent toluene and about 3 percent benzene, the yield of styrene based on initial ethylbenzene being approximately 75 weight percent.

From the foregoing description it will be seen that the dehydrogenation step offers many unique advantages. Under the defined conditions the dehydrogenation catalyst is autoregenerative so that the dehydrogenation system may be operated continuously without the necessity of interrupting charging stock flow through the reactor for effecting regeneration. The styrene yields are of a higher order of magnitude than have heretofore been attainable in ethylbenzene dehydrogenation systems. Only about 5 percent of the initial hydrocarbon charge was converted to gas and both the xylene diluent and the steam serve as heat carriers and diluents for improving the effectiveness of dehydrogenation. If pure ethylbenzene were employed without the added benefit of xylene diluent, the maximum single pass conversion of ethylbenzene to styrene would only be about 60 percent while in the defined process employing both steam and xylene diluent, styrene yields in a single pass of about 75 percent or higher can be obtained.

Heretofore commercial polystyrene processes have all required separation and purification of styrene monomer which required large capital investment and operating expense and which presented innumerable procedural and control difficulties. In the present invention no such separation or purification of styrene monomer is necessary. The crudely separated xylene solution of styrene monomer is simply passed by line 47 through a dryer which may, for example, be alternate towers 48 and 48′ containing a desiccant such as bauxite for decreasing the water content of the xylene solution to below 50 parts per million, preferably to about 20 parts per million. The dried solution is then introduced by line 50 into polymerization reactor 51 which is provided with a stirrer 52 driven by motor 53. The reactor is preferably operated batch-wise so that when a reactor charge is thus introduced a valve in line 50 is closed and the reactor is evacuated by withdrawing gases and vapors through line 54 and cooler 55 to separator 56, the condensed vapors being returned to the reactor by line 57 and uncondensed gases being withdrawn through line 58 by pump 59 which discharges through line 60. Obviously, the desired vacuum may be obtained by water or steam eductor or any other known means instead of by pump 59. The extent to which the reactor is evacuated is determined by the type of polymer to be produced. Thus, for producing a molding grade polymer having an intrinsic viscosity $(n)$ of about 1.0 and an impact strength as determined by the Izod method of about .2–.3, the desired polymerization temperature may be about 50° C. and evacuation by line 59 is continued until the liquid in the reactor is boiling free at the desired temperature. When the degree of vacuum and desired polymerization temperature have thus been attained, finely divided sodium catalyst dispersed in xylene is introduced through line 61 to obtain about .3 weight percent sodium based on the total styrene monomer in the reactor charge. As above stated, the sodium should have a particle size less than 100 microns, the average particle size in this example being about 20 microns, and the introduced sodium dispersion containing about 50 percent by weight sodium in xylene.

With the stirrer maintaining an intimate mixture of the introduced catalyst in the solution of styrene and xylene and the temperature being maintained substantially constant, at 50° C. in this example, by slight boiling of the solution, about 5 to 20 minutes elapse before the polymerization reaction commences. After this induction period the polymerization rate is extremely rapid and the vapor removal and condensing system (elements 54, 55, 56 and 57) must be adequate to recover, condense, and return all liberated vapors without substantial change in pressure in the reactor system which during this time is maintained substantially constant by evacuating means 59. When approximately 60 percent of the styrene monomer has been converted into polymer (which may be determined by testing samples periodically withdrawn from the reactor for viscosity or for styrene content) the pressure in the reactor is decreased by increasing the applied vacuum so that the polymerization temperature is gradually decreased to about 40° C. and held at this lower temperature for approximately 1 hour. Instead of, or in addition to, decreasing the reaction temperature, a reaction promoter such as methylethyl or dimethylether may be introduced through line 62 in amounts sufficient to prevent the polymers formed during the latter part of the polymerization period from being substantially less viscous or of substantial lower molecular weight than polymers formed in the initial stage of the polymerization.

When the polymerization reaction is substantially complete, the viscous polymer solution is pumped from the base of the reactor by pump 63 to filter 64 which is precoated with celite or other inert filter aid material of high surface area effective for removing unreacted sodium and sodium hydroxide from the solution, the filter aid with removed catalyst being withdrawn through line 65. While filtration through a filter aid material is a preferred method of eliminating catalyst, alternative methods may be employed; the solution may be passed through a bed of $Na_2SO_4.6H_2O$ for insuring conversion of sodium to sodium hydroxide and then through $NaHSO_4$ to convert sodium hydroxide to sodium sulfate with liberation of water and finally, through a desiccant bed such as bauxite for removing the water.

The catalyst-free solution is withdrawn from the filter through line 66 to polymer solution surge drum 67 and if it is desired to produce a polystyrene of high impact properties, about 10 percent of GRS rubber may be added to the polymer solution in line 66 through line 66a so that the rubber is intimately mixed with the polymer solution when it reaches the surge drum. Polymer solution is introduced from the surge drum by pump 68 through line 69 to heater 70 wherein the solution is heated to a temperature of about 260° C. and the heated solution is then introduced into flash tower 71 from which solvent is removed through line 72 by pump 73 at a rate to maintain a flash drum pressure of about 6 p. s. i. a. (although atmospheric distillation may be employed at this stage). Most of the solvent is thus removed from the polymer solution and the remaining solution, which now is about 75 percent polystyrene in xylene is passed through line 74 through distributor nozzles or orifices 75 in vacuum drum 76, sufficient heat being added at distributors 75 or in the vacuum drum to maintain the temperature in the vacuum drum at about 100 to 250° C., preferably about 200° C. Solvent vapors are removed from the vacuum drum by line 77 and pump 78 for maintaining the absolute pressure therein less than 50 millimeters of mercury, preferably about 10 millimeters of mercury. The thin streams of polymer which emerge from distributor nozzles or orifices are thus substantially denuded of solvent before they reach the base of the vacuum drum.

The solvent-free polymer is picked up at the base of the vacuum drum by an extruder 79 driven by motor 80, the extruder providing the necessary seal for maintaining the high vacuum and discharging a hot rod or ribbon of polystyrene 81 which contains less than 1 percent xylene and which is preferably cooled in an inert, e. g., nitrogen, atmosphere or by spraying a cooling fluid such as water or a cold inert gas thereon from distributors 82. The cooled polystyrene ribbon or rod is then pelleted by conventional means in pelleting equipment 83 for obtaining the styrene pellets of desired size and the pellets are discharged by line 84.

Solvent discharged by pumps 73 and 78 may be introduced by line 85 through suitable condensers (not shown) to solvent-treating system 86 for removing any unreacted styrene monomer by contact with clay, reaction with maleic anhydride or by any other conventional means. The styrene-free solvent then passes by line 87 to a fractionation system diagrammatically represented by tower 88 for separating a light benzene-toluene fraction through line 89, a xylene-ethylbenzene fraction through line 90 and a bottoms fraction through line 91.

From the foregoing description it will be seen that most of the xylenes originally introduced with the ethylbenzene through line 10 serve an important function in increasing styrene production in the dehydrogenation reactor, serve the function of a styrene carrier for introducing the monomer to the polymerization step, serve as a refrigerant of styrene boiling range in the polymerization reactor and serve as a polymer diluent which enables catalyst separation from the polymer, the bulk of the xylenes finally being obtained as one of the product streams discharged through line 90. Only a small amount of the total $C_8$ aromatics is converted to gas, benzene and toluene in the dehydrogenation step, most of the xylene diluent being ultimately recovered from the original charge in the final solvent distillation step. Thus the polystyrene process of this invention for the first time makes it practically feasible on a commercial scale to prepare high quality molding grade polystyrene from a petroleum by-product ethylbenzene in a manner which is enormously simpler and less expensive than any commercial styrene process heretofore known to the art.

In a pilot plant demonstration of the process of this invention a charging stock was employed containing about 28 percent ethylbenzene in a mixture of ortho-, meta-, and paraxylenes produced by Udex extraction of hydroformed naphtha, the infrared analysis of the charging stock being set forth in the following table. The pilot plant run was continued for 190 hours using 2 liters of Shell 205 catalyst as hereinabove described. It was conducted isothermally at about 1300° F. with a liquid hourly space velocity of about 0.84 and with about a 2.5:1 steam-to-hydrocarbon weight ratio under a reactor pressure of about 3 p. s. i. g. Infrared analyses of the products produced at various run intervals are shown in the following table:

|  | Charge | Dehydrogenation Products | | |
| --- | --- | --- | --- | --- |
|  |  | 7–10 Hours | 43–46 Hours | 187–190 Hours |
| Benzene | 0 | 3.0 | 3.1 | 2.3 |
| Toluene | 2.2 | 10.1 | 3.2(7.7) | 8.6 |
| Ethylbenzene | 28.0 | 6.0 | 7.8 | 7.0 |
| o-Xylene | 19.4 | 16.0 | 15.8 | 16.5 |
| m-Xylene | 39.1 | 34.2 | 34.3 | 35.2 |
| p-Xylene | 11.3 | 8.5 | 8.5 | 9.1 |
| Styrene | 0 | 22.2 | 22.8 | 21.3 |
|  | 100.0 | 100.0 | (100.0) | 100.0 |
| Wt. percent HC to gas |  | 5.6 | 5 | 4.8 |
| Styrene Yield, St. percent on Ethylbenzene Charge |  | 75.4 | 77.5 | 72.5 |

It will be noted that throughout the run the yield of styrene was about 75 weight percent based on ethylbenzene charged; laboratory dehydrogenation runs have shown that even higher conversions of ethylbenzene to styrene may be effected under the defined conditions so that in commercial operations ethylbenzene to styrene conversions of at least 70 weight percent and usually about 75 weight percent or higher should be attainable with gas losses based on total hydrocarbon charge amounting to substantially less than about 5 percent by weight. The attainment of such conversions on a once-through basis demonstrates the remarkable effectiveness of the defined dehydrogenation technique.

A composite of the product obtained in the pilot plant dehydrogenation run was fractionated at reduced pressure and at .5 reflux ratio to remove tars; in the experimental work about 90 percent of the charge was taken overhead although in commercial operation about 98 percent or more of the liquid dehydrogenation product would be taken overhead. The condensed overhead stream contained 23.2 weight percent styrene by ultraviolet analysis. This material was dried by percolation over alumina and then polymerized by dispersed sodium in xylene, the particle size of the dispersed sodium being in the range of 5 to 50 microns, i. e. about 20 microns, and the sodium being added in an amount sufficient to give 0.13 weight percent sodium based on styrene monomer. Vacuum refluxing was applied to maintain the polymerization temperature at 50° C. The polymerization was continued for about 3 hours. Catalyst was removed from the polymer solution by filtration through a celite-coated filter using 50 p. s. i. g. pressure. The yield was about 93 weight percent based on monomer charged and its intrinsic viscosity (measured in benzene at 30° C.) was 0.97. A molded sample of the polymer had good clarity and color.

The specific example was directed to the manufacture of molding grade polystyrene at a polymerization temperature of about 50° C. and an absolute pressure of about 30 millimeters of mercury. By incorporating required amounts of natural or synthetic rubber into the polymer solution before removing solvent therefrom, a different grade of polymer may be obtained which is characterized by an intrinsic viscosity $(n)$ of about .7 to 1.3 and with an impact value as determined by the Izod method of 0.5 to 8.0. The natural or synthetic rubber may be introduced into polymerization reactor 51 prior to or during styrene polymerization instead of to line 66. When polymerization is effected at a temperature of the order of 80° C., a floor tile grade of polystyrene may be obtained which is characterized by an intrinsic viscosity in the range of about 0.15 to 0.5. By proper control of reaction temperature and/or by the use of known accelerators and catalyst modifiers, various other types and grades of polystyrene may be produced. Furthermore, fillers, pigments and the like may be incorporated in the polystyrene solution prior to removal of solvent therefrom for making polystyrene pellets for specific molding purposes. The sodium catalyst may be removed from the polymer solution by water washing instead of by the techniques heretofore described. The polystyrenes produced with dispersed sodium catalyst are, of course, free from residual peroxides which tend to cause greater instability when exposed to light. Other advantages and alternative steps and conditions will be apparent from the above description to those skilled in the art.

We claim:

1. The method of making polystyrene from ethylbenzene contained in a $C_8$ aromatic stream obtained from hydroformed naphtha which method comprises dehydrogenating said ethylbenzene in the presence of $C_8$ aromatic diluents to obtain an aromatic solution of styrene monomer which is substantially free from tar and water and which contains about 15 to 25 percent styrene, contacting said aromatic solution of styrene monomer with a finely divided dispersed sodium catalyst at a controlled temperature in the range of about 40 to 75° C., controlling the temperature in the polymerization step by boiling solution therein under reflux conditions at controlled subatmospheric pressure, separating catalyst from the resulting polymer solution after the polymerization step, distilling the major portion of the solvent from the remaining polymer solution, removing substantially all of the remaining solvent from the solution by exposing thin streams of concentrated polymer solution to a temperature in the range of about 100 to 250° C. under a pressure less than 50 millimeters of mercury and cooling the substantially solvent-free polymer.

2. The method of claim 1 which includes the step of adding about 2 to 20 percent of a rubber selected from the class consisting of natural rubber and synthetic rubber into the styrene monomer solution before polymerization thereof is completed.

3. The method of claim 1 which includes the step of adding about 2 to 20 percent of a rubber selected from the class consisting of natural rubber and synthetic rubber to the solution of polystyrene in aromatic diluent after catalyst has been separated from said solution.

4. The method of claim 1 which includes the step of decreasing polymerization temperature when about 60 percent of the styrene monomer has been polymerized.

5. The method of claim 1 wherein sodium catalyst is removed from polymer solution by filtration.

6. The method of claim 1 wherein sodium catalyst is removed from the polymer solution by washing with water.

7. The method of claim 1 wherein sodium catalyst is removed from the polymer solution by passing the solution through a bed of $Na_2SO_4.6H_2O$ for converting sodium to sodium hydroxide, then through $NaHSO_4$ to convert sodium hydroxide to sodium sulfate with liberation of water and finally through a desiccant for removing the liberated water.

8. The method of claim 1 which includes the step of introducing a reaction promoter during the polymerization step after about 60 percent of the styrene monomer has been polymerized.

9. The method of claim 1 which includes the step of cooling the substantially solvent-free polymer in the presence of an inert cooling fluid.

10. The method of claim 1 which includes the steps of recovering solvent removed from styrene polymer and fractionating said solvent to recover xylenes introduced with initial ethylbenzene.

11. The method of making polystyrenes which comprises adding to $C_8$ aromatics containing 10 to 40 percent ethylbenzene and separated from products of naphtha hydroforming about 2½ parts by weight of steam per part of $C_8$ aromatics, preheating said mixture to a temperature of the order of 500° C., then increasing the temperature of the preheated mixture to about 700° C. in a small fraction of a second and contacting the hot mixture in a reaction zone at a temperature of approximately 700° C. and under a pressure in the range of about 1 to 10 p. s. i. g. with a steam-regenerative, alkali-promoted iron oxide dehydrogenation catalyst at a space velocity in the range of about .4 to 4 volumes of liquid charge solution per volume of catalyst space per hour with a hydrocarbon residence time in the reaction zone of about .2 to .6 second, separating gases, water and tar from the dehydrogenated product stream, then drying said product stream and introducing it into a polymerization zone, reducing the pressure in the polymerization zone to a level at which the dried product stream boils at a predetermined temperature in the range of 40 to 75° C., introducing about .1 to .6 weight percent of finely divided sodium dispersed in a solvent into the dried dehydrogenation product stream in the polymerization zone and intimately admixing the introduced catalyst with said dried dehydrogenation product stream, removing heat of polymerization by boiling liquids in the polymerization zone, removing the resulting vapors as fast as they are liberated, condensing vapors and returning condensate while maintaining the polymerization zone at the pressure required for maintaining the predetermined temperature, separating catalyst from polymer solution when polymerization is completed, and removing solvent from said solution to obtain a polymer containing less than 1 percent solvent.

12. The method of claim 11 which includes the step of removing most of the solvent from the catalyst-free polymer solution by distillation to obtain a more viscous polymer solution and discharging the viscous solution in thin streams through orifices into a vacuum chamber at a temperature in the range of about 100 to 260° C. under a pressure less than 50 millimeters of mercury.

13. The method of making polystyrene which comprises preparing a solution of about 15 to 25 percent styrene in aromatic hydrocarbons containing not more than 8 carbon atoms per molecule, which solution is substantially free from higher boiling components and which contains less than 50 parts per million of water, polymerizing the styrene in said solution at a temperature in the range of about 40 to 75° C. which is controlled by vaporizing solvent and monomer in a polymerization zone at regulated subatmospheric pressure, condensing the vaporized solvent and monomer and returning the condensed vapors to said zone, the styrene monomer having about the same boiling point as the aromatic solvent so that the styrene concentration is substantially the same in the liquid and vapor phases, effecting said polymerization with dispersed metallic sodium in an amount in the range of about .1 to .6 weight percent based on styrene, and in the presence of an ether promoter, separating the sodium from the resulting polymer solution, removing most of the solvent from the solution to give a concentrated polymer solution and passing said concentrated solution in at least one thin stream through a vacuum zone to an extruder outlet, said vacuum zone being under a pressure not substantially higher than 50 millimeters of mercury and at a temperature in the range of about 100 to 250° C. for removing the remainder of the solvent.

14. The method of claim 13 which includes the step of adding about 2 to 20 percent of a rubber selected from the class consisting of natural rubber and synthetic rubber into the styrene monomer solution before polymerization thereof is completed.

15. The method of claim 13 which includes the step of adding about 2 to 20 percent of a rubber selected from the class consisting of natural rubber and synthetic rubber to the polystyrene solution after separation of sodium therefrom.

References Cited in the file of this patent
UNITED STATES PATENTS

| Number | Name | Date |
| --- | --- | --- |
| 2,181,771 | Scott | Nov. 28, 1939 |
| 2,245,619 | Stearn | June 17, 1941 |
| 2,425,501 | Wiley | Aug. 12, 1947 |
| 2,540,996 | Ryden | Feb. 6, 1951 |
| 2,574,439 | Seymour | Nov. 6, 1951 |

OTHER REFERENCES

Boundy-Boyer: "Styrene, its Polymers," etc., pages 35–36, Reinhold (1952).